United States Patent [19]
LaManna et al.

[11] Patent Number: 5,389,917
[45] Date of Patent: Feb. 14, 1995

[54] LAPEL DATA ENTRY TERMINAL

[75] Inventors: Vincent T. LaManna, Webster; Jay M. Eastman, Pittsford, both of N.Y.

[73] Assignee: PSC, Inc., Webster, N.Y.

[21] Appl. No.: 18,591

[22] Filed: Feb. 17, 1993

[51] Int. Cl.6 .................. G06F 7/06; G06F 3/16; G06F 15/20; G06K 7/10
[52] U.S. Cl. .................. 340/825.3; 340/825.34; 235/472; 364/403
[58] Field of Search .......... 340/825.3, 825.31, 825.15, 340/825.34; 235/383, 472; 364/401, 403

[56] References Cited

U.S. PATENT DOCUMENTS

| | | | |
|---|---|---|---|
| 3,876,863 | 4/1975 | Boone | 364/403 |
| 4,471,218 | 9/1984 | Culp | 235/472 |
| 4,677,657 | 6/1987 | Nagata et al. | 340/825.34 |
| 5,006,699 | 4/1991 | Felkner et al. | 235/472 |
| 5,187,646 | 2/1993 | Koch . | |
| 5,189,291 | 2/1993 | Siemiatkowski | 235/472 |
| 5,208,449 | 5/1993 | Eastman et al. . | |
| 5,218,187 | 6/1993 | Koenck et al. | 235/472 |
| 5,227,614 | 7/1993 | Danielson et al. | 235/380 |
| 5,272,324 | 12/1993 | Blevins | 235/472 |

*Primary Examiner*—Donald J. Yusko
*Assistant Examiner*—Mark H. Rinehart
*Attorney, Agent, or Firm*—M. LuKacher; J. Murphy

[57] ABSTRACT

To enhance the effectiveness of personnel conducting inventory management functions, including data entry of information for products as to their presence, absence, or location, the operator-user is provided with a small and lightweight lapel data entry terminal which can be comfortably worn on a lapel of the operator's clothing, and which can be used to enter data into a remote data center. The lapel data entry terminal provides for acquisition and entry of data derived from verbal pronouncement of code data into a microphone which is coupled to a transmitter through a speech or voice recognition sub-assembly and an analog-to-digital converter sub-assembly. The lapel terminal provides for acquisition and entry of data derived from optical scanning of codes affixed to objects, for example, optical bar code patterns. Such optical codes are read by an optical code reader whose signal output is also coupled to the transmitter. For optical code reading only, the lapel data entry terminal may be temporarily removed from the lapel, and optical code reading is actuated. The wearer of the lapel terminal can receive verbal instructions or directives from the remote data center through a radio receiver which is coupled to a loudspeaker or ear-piece through a digital-to-analog converter sub-assembly and a voice synthesizer sub-assembly. All components and sub-assemblies, as well as a rechargeable battery, are contained within the housing of the lapel data entry terminal.

12 Claims, 3 Drawing Sheets

LAPEL DATA ENTRY TERMINAL

The present invention relates generally to data entry and data conveyance systems and particularly to a data entry terminal of miniature size and light weight, which can be worn on the lapel of an operator's clothing, so as to minimize operator effort, reduce operator fatigue, and enhance productivity for data entry and data conveyance.

The invention is especially suitable for providing, in one unit, both optical and verbal data entry, and for conveying entered data to a more powerful transmitter-receiver unit, which can be worn on an operator's belt, and which is capable, in turn, to be in communication with a central communications facility, for example, a distribution center or warehouse responsible for delivery, pricing, stocking, and inventory management functions of a supermarket or of a chain of supermarkets. Thus, in the aforementioned supermarket procedures, an operator responsible for inventory control in the retail division of the supermarket organization would wear the lapel data entry terminal of the present invention removably attached to the operator's lapel and a larger-dimension transmitter-receiver unit attached, for example, to the operator's belt. If, for example, the operator's responsibility is to check the number of inventory items and the variety and currently listed retail prices of items placed on retail shelves, the present invention provides, for example, the following sequence of communication events between a central communication facility (the center) and the operator on the retail floor (operator):

(a) center pages operator (by radio) with an operator designation code;

(b) operator's belt-unit receiver responds to page message, for example, a beep-signal, which actuates a low-power first transmitter in operator's belt unit to transmit via radio, infra-red, ultrasonic or wire link, said beep-signal or another readily audible signal to operator's lapel data entry terminal which contains a receiver responsive to said first transmitter of said belt unit and also contains a loudspeaker;

(c) operator hears beep signal from lapel data entry terminal;

(d) operator acknowledges receipt of page signal by entering verbally a location code, for example, by pronouncing the operator's location as "one nine four", indicative of location at "aisle nineteen, section four", into a microphone contained in operator's lapel entry terminal;

(e) operator's location code pronouncement is transmitted by the lapel terminal's voice-actuated low-power transmitter to the receiver in operator's belt unit, whereupon a second, more powerful transmitter in the belt unit is actuated to transmit operator's location code to the center;

(f) center instructs operator to check inventory in the frozen vegetable section; operator proceeds to frozen vegetable section and starts inventory of frozen beans:

(g) operator removes the lapel terminal from lapel and actuates a switch means in the (now hand-held) lapel terminal to actuate an optical bar code reader contained within the lapel data entry terminal, scans the bar code-reading light beam, emanating from an aperture of the lapel terminal, across the bar code symbols printed on a package of frozen beans, thereby actuating the lapel terminal's transmitter to transmit data representative of the optical bar code data to the receiver in operator's belt unit and, via the thereby actuated more powerful transmitter in the belt unit, to the center, where the data are entered into a suitable inventory control system. The optically read (scanned) and electronically conveyed data are uniquely indicative of all identical packages of frozen beans as to manufacturer, type of beans, weight of contents and price per package, etc.

(h) having entered and transmitted or conveyed the uniquely indicative bar code data read by the optical bar code reader of the lapel data entry terminal, the operator deactivates the optical bar code reader by deactuating said switch means, reattaches the lapel terminal to the lapel (thereby freeing operator's hands), and the operator now proceeds to count all packages of frozen beans identical to the package which had been optically bar code scanned.

(i) operator pronounces, in a general direction toward the lapel data entry terminal, the counted number of identical frozen bean packages, for example, "Zero Five Seven", indicative of fifty seven packages of frozen beans identical to the package whose optical bar code data had been entered initially by using the lapel data entry terminal. The verbal pronouncement of this count (of packages) voice-actuates the lapel terminal's transmitter, which enters (by transmission) the count into the belt-unit's receiver, and is thus conveyed by the belt unit's more powerful transmitter for data entry at the center. Thus, the initial optical bar code data entry, initiated by the bar code reader within the lapel data entry terminal, entered data uniquely indicative of the produce; and the subsequent verbal (or voice-responsive) data entry, initiated by the voice-actuated microphone/transmitter data entry function of the lapel data entry terminal entered data uniquely indicative of the number of packages of that product;

(j) operator next starts the inventory of frozen peas packages by entering optical bar code data of particular frozen peas packages via the lapel data entry terminal (repeat of step (g) above);

(k) operator deactuates lapel terminal's optical bar code reader (repeat of step (h) above), and (l) operator counts particular frozen peas packages, and by verbal pronouncement enters the count via the microphone in the lapel data entry terminal (repeat of step (i) above).

Upon completing the inventory assignment in the frozen vegetable section, operator keeps the lapel data entry terminal attached to lapel of operator's clothing and anticipates subsequent directives. If the lapel data entry terminal has been used for a period of time sufficient to warrant recharging of the re-chargeable battery power supply contained within the lapel terminal, the terminal may notify the operator verbally "low battery" and the operator will insert the lapel terminal into a battery charger unit, such that battery charging terminals mechanically recessed in the lapel terminal provide electrical connection to mating terminals in the battery charger unit. To remain equipped with a lapel data entry terminal, operator attaches a previously battery-charged lapel terminal on the lapel of his or her clothing. The lapel terminal may also be batch oriented, i.e.

all data stored in battery backed RAM and downloaded when placed in the charger.

The foregoing illustrative example highlights the principal objects, aspects, features, and advantages of the lapel data entry terminal (also referred to in shortened terms as "the lapel terminal") in accordance with the present invention:

It is a principal object of the present invention to provide a lapel data entry terminal having sufficiently miniaturized dimensions and sufficiently light weight, so as to be readily and removably attachable to a lapel of an operator's or user's clothing, or other convenient location and to be comfortably wearable when attached to the lapel; or other convenient location.

It is a further object of this invention to provide a lapel data entry terminal having an actuatable and deactuatable optical data acquisition capability which, in the actuated state, enters optically derived data automatically into either ram storage or a data/center through an intermediate communication link, for example, a cable or a transmitter-receiver unit worn on an operator's belt.

It is a further object of the present invention to provide a lapel data entry terminal having a voice-actuated data entry capability for automatically entering verbally pronounced data into either data (RAM) storage or a data center receiver through an intermediate communication link, for example, a cable or a transmitter-receiver unit worn on an operator's belt.

It is another object of the present invention to provide a lapel data entry terminal wherein the lapel terminal's optical and verbally pronounced data entry functions are achieved by optical and electronic sub-assemblies contained within the lapel terminal housing, and wherein these optical and electronic sub-assemblies receive electrical power from rechargeable battery means also contained within the lapel terminal's housing.

Briefly described, a lapel data entry terminal embodying the invention, does not require a manual keyboard or keypad to effect data entry. It is embodied in a lapel terminal comfortably worn on a lapel or other suitable location on an operator's clothing. The lapel terminal contains an optical code reader for scanning an optical code affixed to a product when actuated. Optical code scanning actuates the data entry function of the lapel terminal. The terminal also contains voice-responsive means for entering data by verbal pronouncement of alphanumeric characters, said pronouncement also actuating the data entry function of the lapel terminal. Additionally, the lapel data entry terminal also contains a small loudspeaker, associated with a radio receiver within the lapel terminal, to provide for reception of audible instructions by the operator of the lapel terminal from a radio transmitter at a remote location. The lapel terminal derives electrical power for its functions from a built-in rechargeable battery.

The foregoing and other objects, features, and advantages of the invention, as well as a presently preferred embodiment thereof, will become more apparent from the following detailed description in conjunction with the accompanying drawings, wherein.

Figure 1:
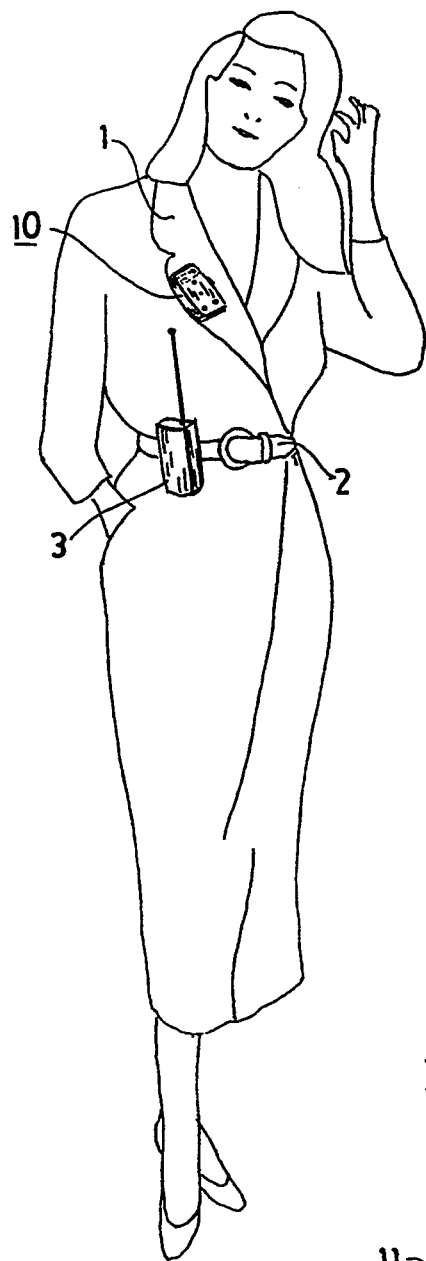
FIG. 1 is a schematic view of a human operator wearing the lapel terminal on the lapel of operator's jacket and wearing a larger transmitter-receiver unit on the belt.
Figure 2:
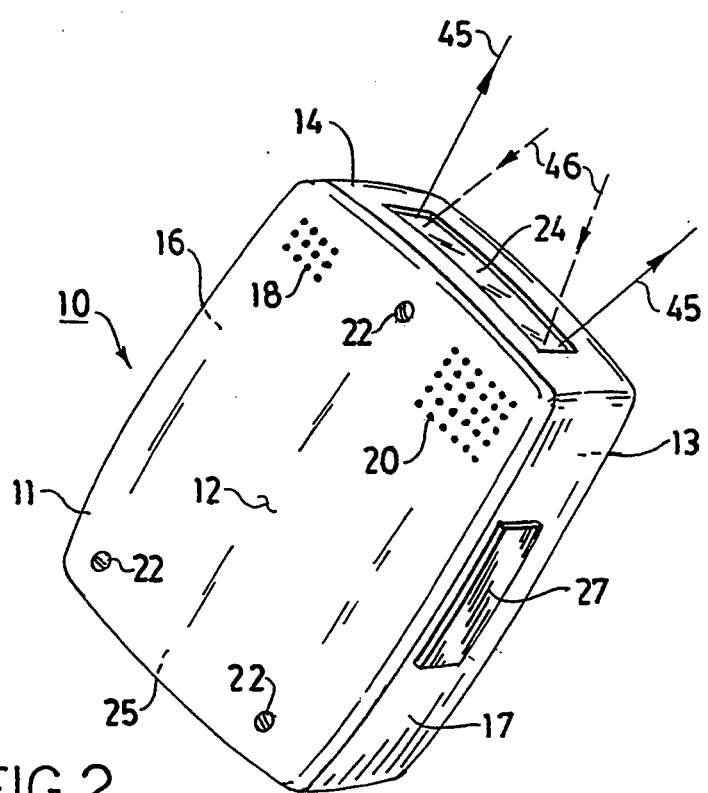
FIG. 2 is a schematic perspective front view of the lapel terminal in accordance with the present invention, showing the optical code reading window optical code reading actuator means and locations of microphone and loudspeaker.

Referring to the drawings, there is shown a lapel data entry terminal 10 attached to an operator's lapel 1 and a transmitter-receiver (also referred to as a transceiver) unit 3 attached to operator's belt 2. Lapel data entry terminal 10 is a unit contained within a housing 11 having approximately square-shaped front and rear surfaces 12 and 13, respectively, approximately rectangle-shaped top and bottom surfaces 14 and 15, respectively, and approximately rectangle-shaped left and right side surfaces 16 and 17, respectively. Front surface 12 has perforations throughout a first domain 18 to allow verbally pronounced (voice) codes to be recorded by a microphone 19 located behind said first-domain perforations. Front surface 12 also has perforations throughout a second domain 20 to transmit audible (sound) signals from a loudspeaker 21 located behind said second-domain perforations. Front surface 12 is removable from housing 11 by removing attachment screws 22 or other fastening means, thereby facilitating access to sub-assemblies inside housing 11.

Top surface 14 of the housing 11 has an elongated opening or aperture 24 through which a suitably shaped optical code-reading light beam 45 is directed at an optical code symbol (bar code) affixed to an object (not shown), and through which light 46 from the symbol returns to housing 11. The receptor 50 is shown on a block to schematically indicate that it includes a photodetector and analog and digital circuits for providing signals representing the symbol. It may include a microprocessor for decoding the signals into digital data. Light 46 returns to the receptor 50 either directly or retro-reflectively via an oscillating scan mirror 53.

Rear surface 13 has disposed on it a clamping or fastening means 26, for example, a spring-urged clip or "velcro" by which lapel data entry terminal 10 is removably attached to operator's lapel 1. Right side surface 17 provides a slightly protruding actuating and deactuating means 27, for example, a pressure-sensitive switch by which the optical code reader light source 52, for example, a laser diode assembly receptor 50, as well as mirror 53 connected to a motor 54 for oscillating the mirror to scan the beam across the symbol on the object, are actuated or deactuated. The scanning operation may also be actuated or deactuated by voice commands. Left side surface 16 has a recessed compartment 28 with recessed electrical contact pins 29 connected (not shown) in the lapel terminal to rechargeable battery 30, and connectable to a battery charging unit outside the terminal 10 (not shown). Additional pins may be used to upload and download data when the lapel terminal is used in batch mode.

Figure 3:
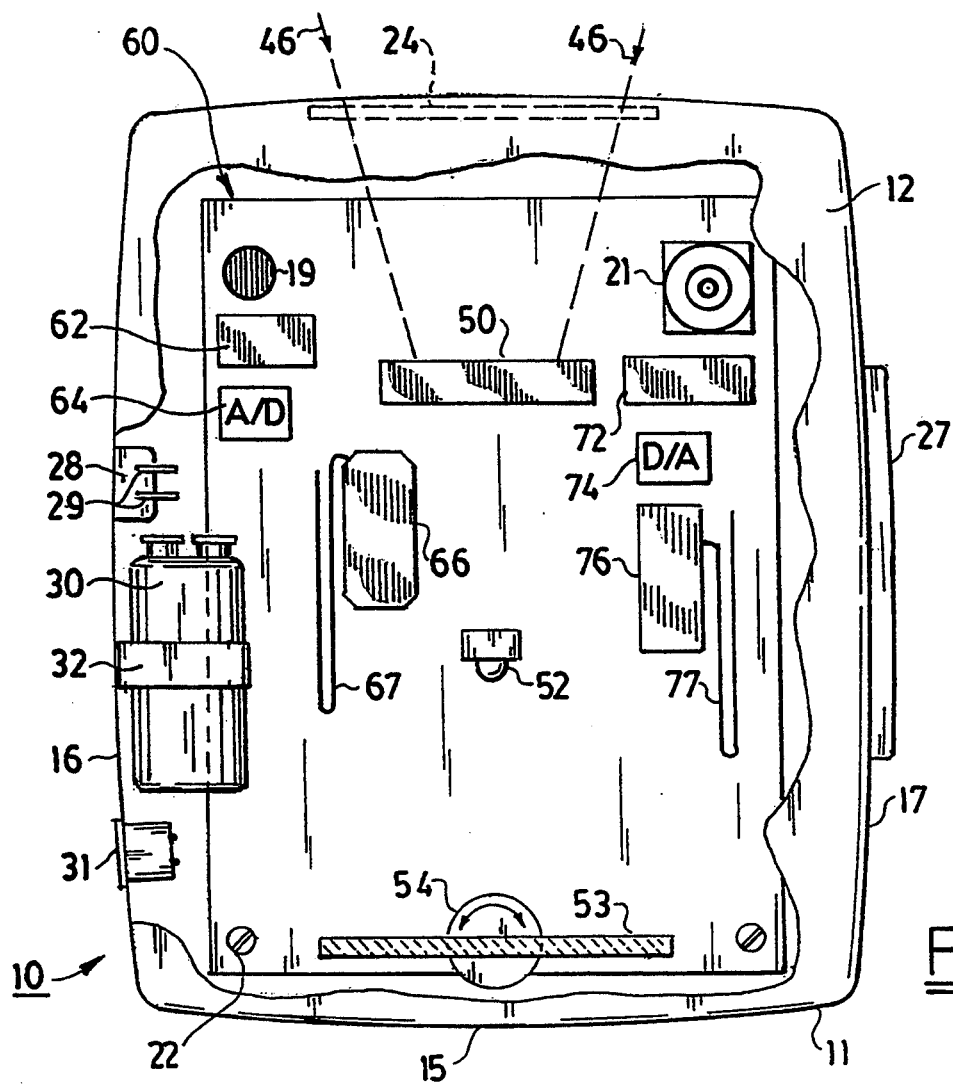
FIG. 3 is an enlarged partial break-away front view of the lapel data entry terminal of FIG. 2, showing schematically some of the major sub-assemblies contained within the lapel terminal.
Figure 4:
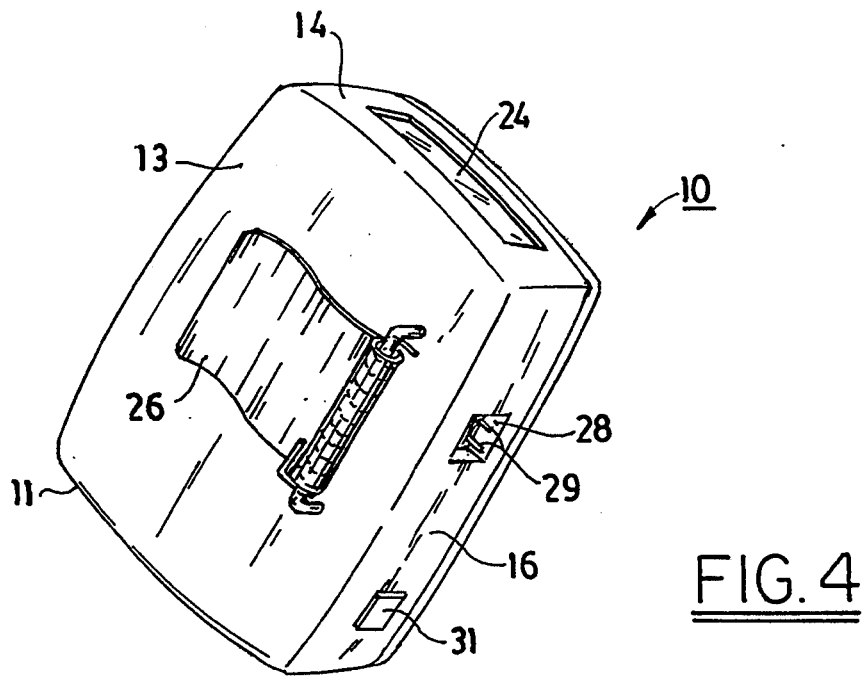
FIG. 4 is a schematic perspective rear view of the lapel data entry terminal, showing lapel attachment means, for recharging of the rechargeable battery, and terminal deactuating means.
Figure 5:
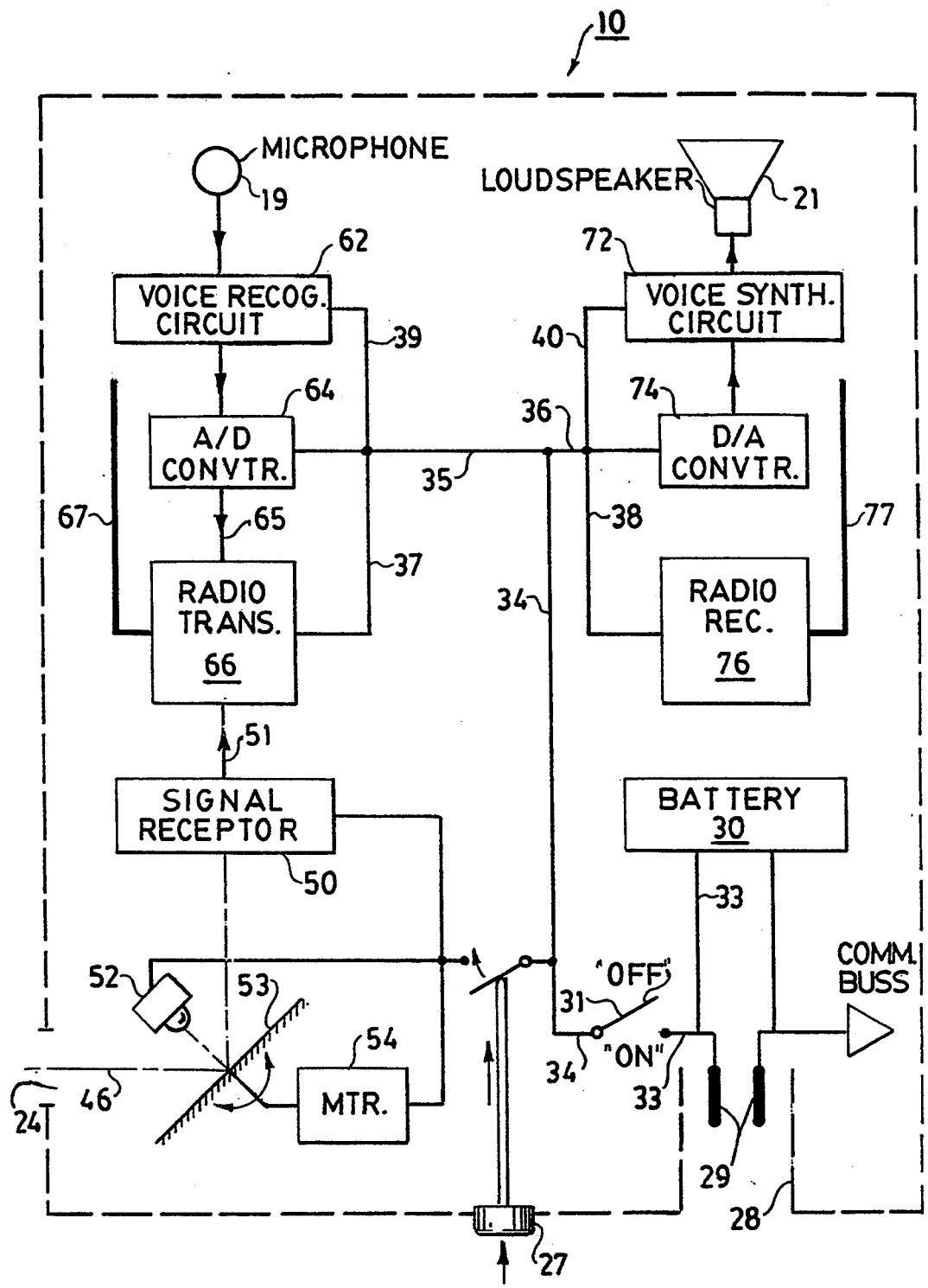
FIG. 5 is a block diagram of the major electronic sub-assemblies contained within the lapel data entry terminal.

Referring particularly to FIG. 3 and FIG. 5, there is shown a printed circuit board 60 extending from the lapel terminal bottom surface to the top surface and from the left to the right side surfaces. The board 60 has mounted thereon the receptor 50, a microphone 19, a speech or voice recognition circuit 62, an analog-to-digital (A/D) converter 64, a low-power radio transmitter 66, a transmitter antenna 67, a small loudspeaker 21, a speech or voice synthesizer circuit 72, a digital-to-analog (D/A) converter 74, a radio receiver 76, and a receiver antenna 77. Also shown located on circuit board 60 is the receptor 50 and a laser diode assembly 52. The laser diode 52 (including its power delivering circuits is operated upon actuation of switch 27 by power from B+ line 34 via switch 31. The other circuits are operated by switch 31 (which is normally closed and opened for recharging) via lines 33–40. The common buss is connected to all components which are powered. The oscillating mirror 53 is suitably mounted (not shown) near the bottom surface 15 of lapel terminal 10, while rechargeable battery 30 is held by a retaining clip 32 in proximity to the left side wall 16 of lapel terminal 10. For clarity of presentation, all components and sub-assemblies are depicted as located on printed circuit board 60 only on the face of the board viewed in FIG. 3. In practice, at least one double-sided printed circuit board 60 facilitates the mounting or deposing of components or sub-assemblies to be suitably distributed on both sides or faces of said printed circuit board.

Optical code (for example, bar code) scanning and code reading may be accomplished with an optical bar code scanner and reader system of the type which is shown in U.S. Pat. No. 5,015,831 issued May 14, 1991, or in U.S. patent application Ser. No. 07-543950 filed Jun. 26, 1990 in the name of J. M. Eastman, et al. now U.S. Pat. No. 5,115,120, issued May 19, 1992. Such scanners and readers are presently preferred because of their miniaturized configuration.

Radio receiver 76 and radio transmitter 66 may be conventional, miniaturized UHF radio receiver and transmitter sub-assemblies. Transmitter 66 can be of relatively low power, since its signal transmitted via transmitter antenna 67 need only be sufficient to communicate with the operator's belt unit receiver-transmitter 3. Instead of radio frequency signals, infrared (IR) or ultrasonic transmission may be used. Also, an extendible (coiled) cable may alternatively be used to connect the terminal 10 to the belt unit. Output signal 51 from receptor 50 is a digital signal representative of the optical bar code affixed to the object being scanned by optical code reading light beam 45 and returned to the receptor 50. The return light is shown schematically by the dashed lines 46. Output signal 51 is one input to transmitter 66, whose second input is the digital output signal 65 from A/D converter 64. Thus, transmitter 66 transmits digitally encoded signals, and thereby enters data into a remote data center (via operator's more powerful transmitter in belt unit 3). Likewise, receiver 76 receives digitally encoded signals which are converted to analog signals in D/A converter 74 and further processed in voice or speech synthesizer 72 to generate command-like audible signals in loudspeaker 21.

It will be apparent from the foregoing description that the operator or user of the lapel data entry terminal enters all verbally pronounced data by pronouncing such data in the general direction of the lapel unit on operator's lapel. For scanning and reading optical bar code, the lightweight, miniaturized lapel terminal is temporarily removed from the lapel. Thus, except during bar code scanning, the operator's hands are free for picking, placing and counting products and for performing other inventory functions. Variations and modifications in the herein described lapel data entry terminal, within the scope of the invention, will undoubtedly suggest themselves to those skilled in the art. For example, an ear jack and plug may be used in noisy environments in place of or to supplement the loud-speaker. Accordingly, the foregoing description should be taken as illustrative, and not in a limiting sense.

We claim:

1. A data entry terminal for bi-directional communication with a remote data center and for entering data into said remote data center, said terminal having sufficiently miniaturized dimensions and sufficiently light weight so as to be comfortably wearable on a lapel of an operator's clothing, comprising:
   a) a housing with light- and sound-transmissive openings;
   b) means for removably attaching said housing to said operator's clothing;
   c) scanner/reader means in said housing for acquiring optical code data signals from a bar coded surface when mechanically actuated by said operator, without physical contact of said terminal with said surface;
   d) means for receiving first verbal pronouncement code data signals from said remote data center;
   e) speaker means for conveying said first verbal pronouncement code data to said operator;
   f) means for acquiring second verbal pronouncement code data signals from said operator; and
   g) RF means for transmitting said optical code data signals and said second verbal pronouncement code data signals to said remote data center.

2. The terminal according to claim 1 further comprising actuating means for actuating said scanner/reader means.

3. The terminal according to claim 2 wherein said actuating means is a mechanically operated switch.

4. The terminal according to claim 2 wherein said means for acquiring said second verbal pronouncement code data signals from said operator is verbally actuable by said operator.

5. The terminal according to claim 1, wherein said scanner/reader means for acquiring optical code data is an optical bar code scanner and reader system.

6. The terminal according to claim 5, further comprising a light-transmissive opening in the terminal housing through which the optical code scanner/optical code reader assembly transmits a scan beam and acquires optical code data.

7. The terminal according to claim 5, further comprising means for actuating said optical code scanner/optical code reader assembly whenever said operator desires to acquire optical code data.

8. The terminal according to claim 1, wherein said means for acquiring said second verbal pronouncement code data signals comprises sound-transmissive openings in said terminal housing, a microphone proximal to said openings, a speech or voice recognition means, and a converting means for converting analog signals to digital signals.

9. The terminal according to claim 1, wherein said RF means for transmitting said optical code data signals and said second verbal pronouncement code data signals to said remote data center includes a wireless link.

10. The terminal according to claim 1, wherein said means for receiving said first verbal pronouncement code data signals comprises a wireless link, speech or voice synthesizer means, and a loudspeaker positioned in proximity to said sound-transmissive openings in said housing.

11. The terminal according to claim 1, wherein said attaching means is selected from a list comprising a clip and a first hook-and-pile fastener element on an exterior surface of said housing, said first hook-and-pile fastener element cooperating as needed with a second hook-and-pile fastener element on said clothing of said operator, for removable attachment of said housing to said clothing of said operator.

12. The terminal according to claim 11, wherein said terminal has:

a) first transducer means for converting audio input into electrical signals;
b) second transducer means for converting electrical signals into audio output;
c) wireless means for receiving commands from said remote data center; and
d) wireless means for transmitting commands to said remote data center, said means for receiving and said means for transmitting being operatively connected to said first and second transducer means, respectively, and said sound-transmissive openings in said housing being on a surface of said housing other than said exterior surface having said clip or fastener thereon.

* * * * *